United States Patent
Wingate

(10) Patent No.: US 7,690,319 B2
(45) Date of Patent: *Apr. 6, 2010

(54) ANCHORING SYSTEM AND METHOD

(76) Inventor: John Russell Wingate, 541 Keith St., Pasadena, TX (US) 77504

(*) Notice: Subject to any disclaimer, the term of this patent is extended or adjusted under 35 U.S.C. 154(b) by 15 days.

This patent is subject to a terminal disclaimer.

(21) Appl. No.: 11/378,603

(22) Filed: Mar. 16, 2006

(65) Prior Publication Data

US 2006/0254494 A1   Nov. 16, 2006

Related U.S. Application Data

(60) Provisional application No. 60/662,499, filed on Mar. 16, 2005.

(51) Int. Cl.
*B63B 21/00* (2006.01)

(52) U.S. Cl. .................. 114/230.23; 114/218
(58) Field of Classification Search ........... 114/230.22, 114/230.23, 230.24, 218; 43/21.2
See application file for complete search history.

(56) References Cited

U.S. PATENT DOCUMENTS

| | | | | |
|---|---|---|---|---|
| 3,851,613 A * | 12/1974 | Armour | ................. | 114/230.23 |
| 4,582,257 A * | 4/1986 | Siegler | ................. | 239/197 |
| 4,697,537 A * | 10/1987 | Smith | ................. | 114/230.23 |
| 4,809,635 A * | 3/1989 | Essig | ................. | 114/230.23 |
| 5,106,248 A * | 4/1992 | Harris | ................. | 410/107 |
| 5,273,468 A * | 12/1993 | Nichols | ................. | 441/6 |
| 5,365,872 A * | 11/1994 | Obrinski | ................. | 114/230.24 |
| 5,535,694 A * | 7/1996 | Czipri | ................. | 114/218 |
| 5,746,149 A * | 5/1998 | Molz | ................. | 114/230.21 |
| 5,752,670 A * | 5/1998 | Lasecki et al. | ................. | 242/381 |
| 5,819,679 A * | 10/1998 | Bonate et al. | ................. | 114/230.23 |
| 6,010,176 A * | 1/2000 | Jones | ................. | 296/100.16 |
| 6,095,075 A * | 8/2000 | Gordon et al. | ................. | 114/230.23 |
| 2007/0266616 A1* | 11/2007 | Rienzo | ................. | 43/21.2 |

* cited by examiner

*Primary Examiner*—Stephen Avila
(74) *Attorney, Agent, or Firm*—The Matthews Firm

(57) ABSTRACT

An apparatus for docking and/or mooring vehicles, particularly water craft and for restraining loads in truck beds or trailers. The apparatus utilizes ropes or cables in housing unit that provides for the extension and retraction of the rope or cables preferably without the need of electrical or manual cranks. The housings are adaptable to be mounted on the vehicle or at an attachment or docking location and are biased to retract but may contain stops or cleats for manually tying off and thus stopping the extension or retraction of the rope or cable. The housings may be further adapted to be flush mounted in relation to surrounding surfaces.

11 Claims, 12 Drawing Sheets

ANCHORING SYSTEM AND METHOD

RELATED APPLICATIONS

This application claims priority from U.S. Provisional Patent Application No. 60/662,499, filed Mar. 16, 2005.

TECHNICAL FIELD

The present invention relates generally to systems and methods for anchoring. More particularly for housing ropes and/or cables in retractable housings for use on vehicles including water craft.

Figure 1A:
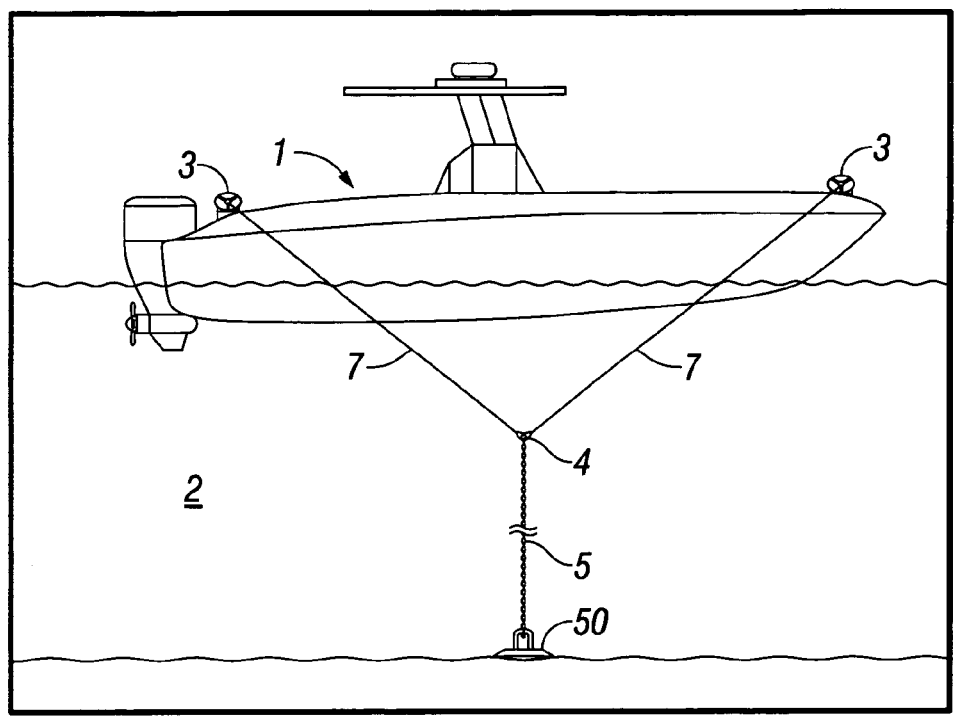
FIG. 1 illustrates a side view of an embodiment of the apparatus attaching a vessel to an anchor in accordance with the present invention.
FIG. 1B illustrates a top view of an embodiment of the apparatus attaching a vessel to a dock in accordance with the present invention.
FIG. 1C illustrates a top view of an embodiment of the apparatus towing a vessel in accordance with the present invention.
FIG. 1D illustrates a top view of an embodiment of the apparatus being towed by a vessel in accordance with the present invention.
FIG. 1E illustrates an embodiment utilizing a sea anchor in accordance with the present invention.
FIG. 1F illustrates a top view of an embodiment of the apparatus mounted in a truck/trailer bed in accordance with the present invention.
FIG. 1G illustrates a top view of an embodiment of the apparatus tethering a water craft in accordance with the present invention.
FIG. 1H illustrates a top view of another embodiment of the apparatus tethering a water craft in accordance with the present invention.
FIG. 1I illustrates a top view of another embodiment of the apparatus tethering a water craft in accordance with the present invention.
FIG. 1J illustrates a top view of another embodiment of the apparatus tethering a water craft in accordance with the present invention.
FIG. 1K illustrates a top pictorial view of another embodiment of the apparatus tethering a water craft in accordance with the present invention.
FIG. 1L illustrates a rear perspective view of another embodiment of the apparatus tethering a load in accordance with the present invention.

A better understanding of the principles and details of the present apparatus, will be evident from the following description taken in conjunction with the appended drawings. The drawings constitute a part of this specification and include exemplary embodiments of the present apparatus, which may be embodied in various forms. It is to be understood that in some instances, various aspects of the apparatus may be shown exaggerated, reduced or enlarged, or otherwise distorted to facilitate an understanding of the present apparatus. For a further understanding of the nature and objects of the present apparatus, reference should be had to the following detailed description, taken in conjunction with the accompanying drawings, in which like elements are given the same or analogous reference numbers.

DETAILED DESCRIPTION

The use of docking and mooring ropes is important in keeping water craft in position, particularly in a dock. In the case of land vehicles, ropes or straps are used to prevent loads from shifting or falling out of truck beds or trailers. Typical docking rope systems and land vehicle cargo retention systems have used electricity or manual cranks to retract the anchoring ropes, cables, or straps into housing units after use. Other systems rely on substantially loose rope which must be tied off at both ends to perform the anchoring function. Many other systems utilize a housing unit which is not flush with the boat, other water craft, or vehicle, possibly causing injuries to non-observant users. Further, these systems can be bulky and can involve tangling or damaging the ropes or lines. It should be understood that the mooring/anchoring/load securing system described herein is applicable to land vehicles, water vehicles, and air vehicles and as such the generic term vehicle is meant to include all vehicles whether adapted for land, water, or air use or any combination thereof and should not be viewed as a limitation thereof. It should be further understood that other water craft includes any type of personal water craft (such as but not limited to, jet skis), small personal or commercial boats/crafts/vehicles (both manually or remote operated), hydroplanes, air boats, duck boats, and other boats/crafts/vehicles, which are used in or near wet environments to which this system is particularly adaptable to. It should be further understood that this system is adaptable to aircraft that land or are moored in water environments. FIG. 1G illustrates the use of the system with personal water craft. Typical personal water craft have no cleats or convenient tie-down mechanisms. In this case a flush mounted anchoring system is particularly desirable due to the many possible directions of falling off the water craft (i.e. a cleat or other tie-down receptacle which substantially protrudes from the personal water craft body could certainly cause serious injury to a user ejected from the personal water craft while it is moving).

In several embodiments the present inventive apparatus addresses some of these concerns. It should be understood that the rope or cable, as used and claimed herein, can comprise any type of device for attaching, docking, or otherwise restraining land, water, or air vehicles and a variety of cargos. Thus, the rope or cable can include, but is not limited to, rope, wire, cable, straps, and the like and should not be viewed as a limitation herein. Further, the material of the rope, cable, or other restraining/attaching component can include, but is not limited to, natural rope, synthetic materials, metal, or any combination therein. As such, the material of the rope, cable or restraining device shall not be a limitation herein. In one embodiment the inventive device requires no electricity to power retraction of the rope into a housing. In another embodiment, the inventive device is flush with the boat or vehicle, wherein there is a decreased likelihood of a user injuring themself on the housing unit or cleat. In another embodiment the device can act as an attachment to an anchor rope to keep a boat stationary.

FIG. 1A illustrates a side view of one embodiment of the apparatus as attached to an anchor 50. As illustrated, the boat or water vehicle 1 is floating in the water 2. Keeping the boat or water vehicle 1 floating substantially in place in the water 2 is an anchor rope 5 attached to an anchor 50. Located on the boat 1 preferably, but not necessarily, on the side and on the back of the boat are the retractable rope housing units 3 (See FIGS. 2 and 3 for further description). The retractable housing units 3 preferably house and hold the rope or cables 7. The rope or cables 7 are preferably constructed of materials such as a high strength nylon, a non-rusting metallic alloy, or a non-corrosive material. The rope or cables 7 preferably retract into the retractable housing units 3 when the ropes or cables 7 are not being used. In the illustrated embodiment of FIG. 1A, the ropes or cables 7 attach to the anchor rope 5 through the use of a metal ring 4 in the manner typical for attachment of a anchor rope 5 to a plurality of other ropes. It should be noted that one of ordinary skill in the art could readily see how to attach only one rope or cable 7 to an anchor rope 5 or to attach a rope or cable 7 directly to an anchor 50. It is preferable that the cables 7 and the retractable rope housing unit 3 are designed to at least partially support a conventional anchor utilized with a boat or water craft 1.

Figure 1B:
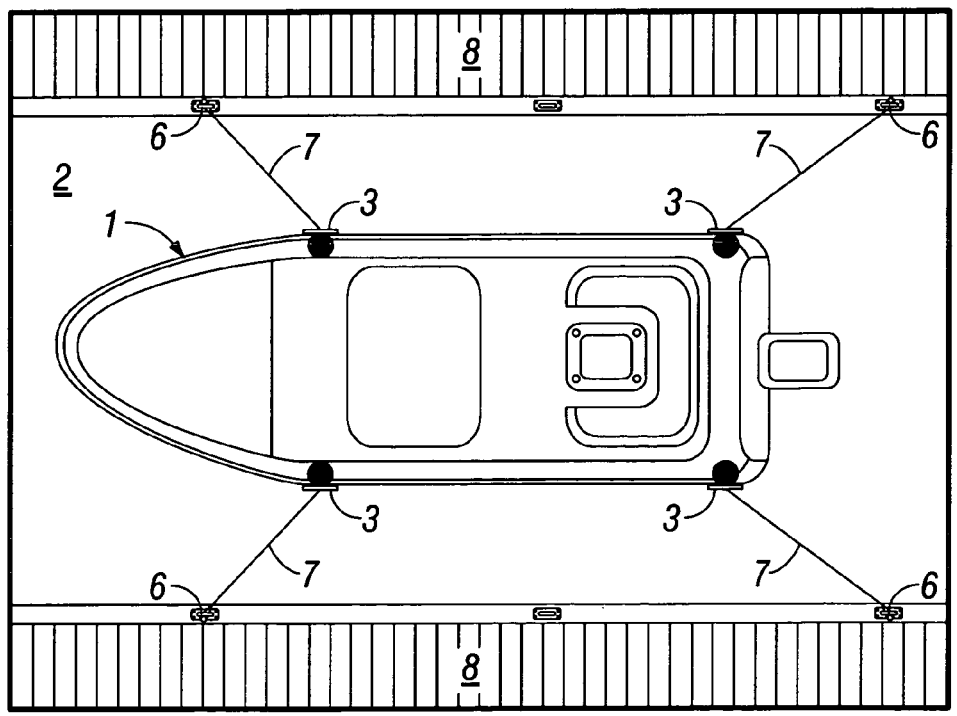

FIG. 1B illustrates one embodiment of the present apparatus as used to anchor a boat to a dock 8. As shown, boat or water craft 1 is moored to the dock 8 in four positions as attached with the retractable rope housing units 3. To attach a boat or water craft 1 to a dock 8, a user need to pull the rope or cables 7 from the retractable rope housing units 3 and tie off the rope or cable 7 on the dock cleats 6. In the illustrated embodiment four retractable rope housing units 3 are being utilized and the rope or cables 7 are attached to four corresponding dock cleats 6. It should be noted that any number of retractable rope housing units 3 could be utilized to attach to any number of dock cleats 6 to moor a boat or water craft 1. To release the boat or water craft 1 from the dock 8, a user should detach the ropes or cables 7 from the dock cleats 6. Upon disconnecting the ropes or cables 7 from the dock cleats 6, the ropes or cables 7 should retract into the retractable rope housing units 3. It should be understood that the rope housing 3 can be mounted on the dock 8, on the water craft 1, or on both. Further, when mounted on the dock 8, the rope housing 3 can be mounted instead of or in addition to the cleat 6 and can either be flush mounted, with the dock 8 surface, can be recessed from the surface, or can be mounted above the dock surface.

Figure 1C:
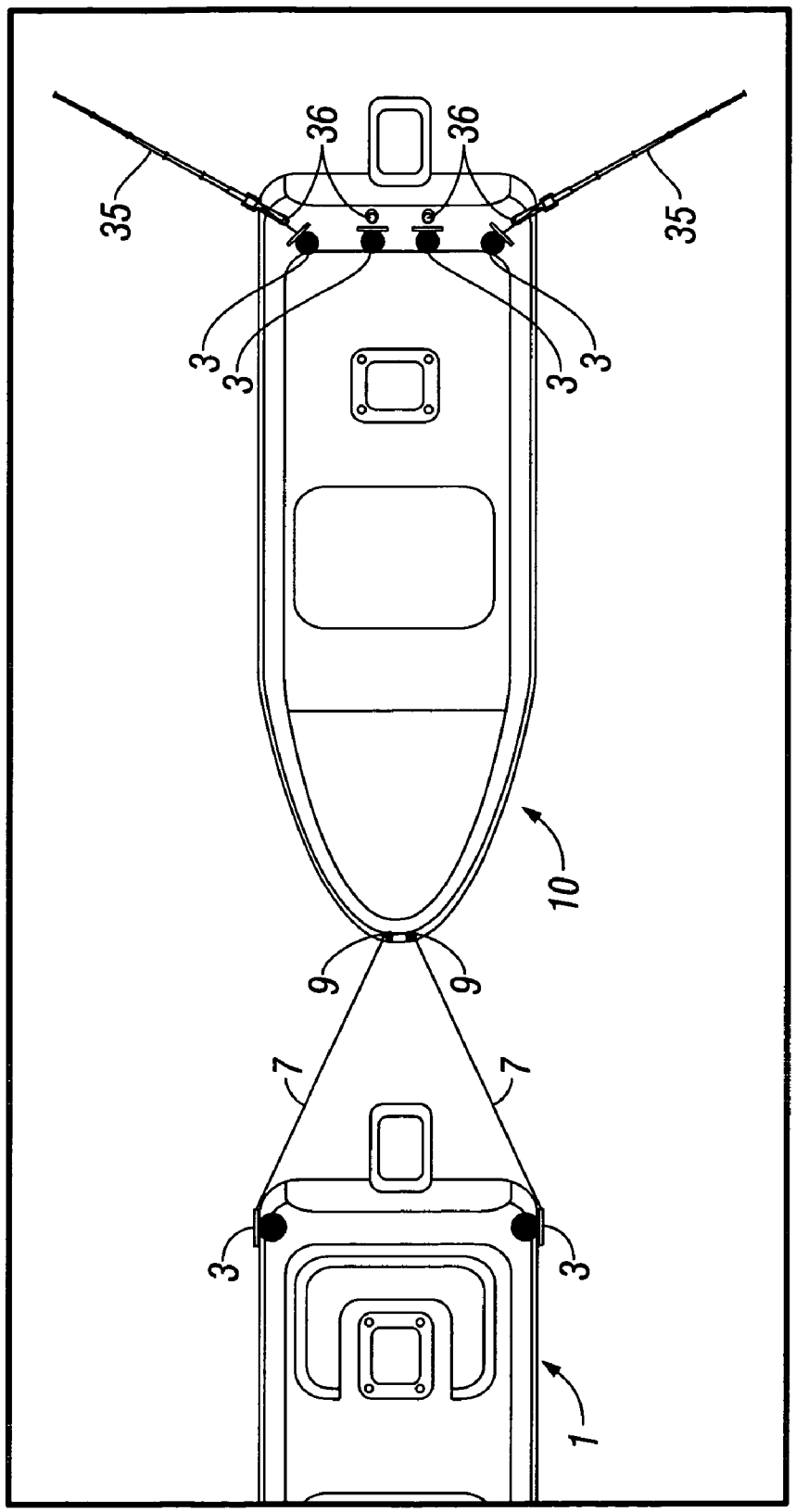

FIG. 1C illustrates a boat being towed by another boat utilizing the apparatus. The boat or water craft 1 is preferably a conventional boat or water craft 1 with the exception of having the retractable rope housing units 3 attached to the back of the boat preferably on the top deck of the boat or water craft 1. Attached to and preferably housed in the retractable rope housing units 3 are the ropes or cables 7. The boat or water craft 10 is of the type typically found in the art with clasps or tie downs 9 located in the front of the boat 10. As illustrated the clasps or tie downs 9 are located at the point of the bow and are preferably designed so as to allow for easy attachment by the ropes or cables 7. Prior to operation, the ropes or cables 7 are attached to the clasps or tie downs 9 in a conventional fashion to allow for towing of the boat or water craft 10. While in operation, the retractable rope housing units 3 are actuated to lock the ropes or cables 7 in place so that the ropes or cables 7 are taught and are capable of towing the boat or water craft 10. At that point the boat or water craft 1 may proceed forward therein towing the boat or water craft 10.

Figure 1D:
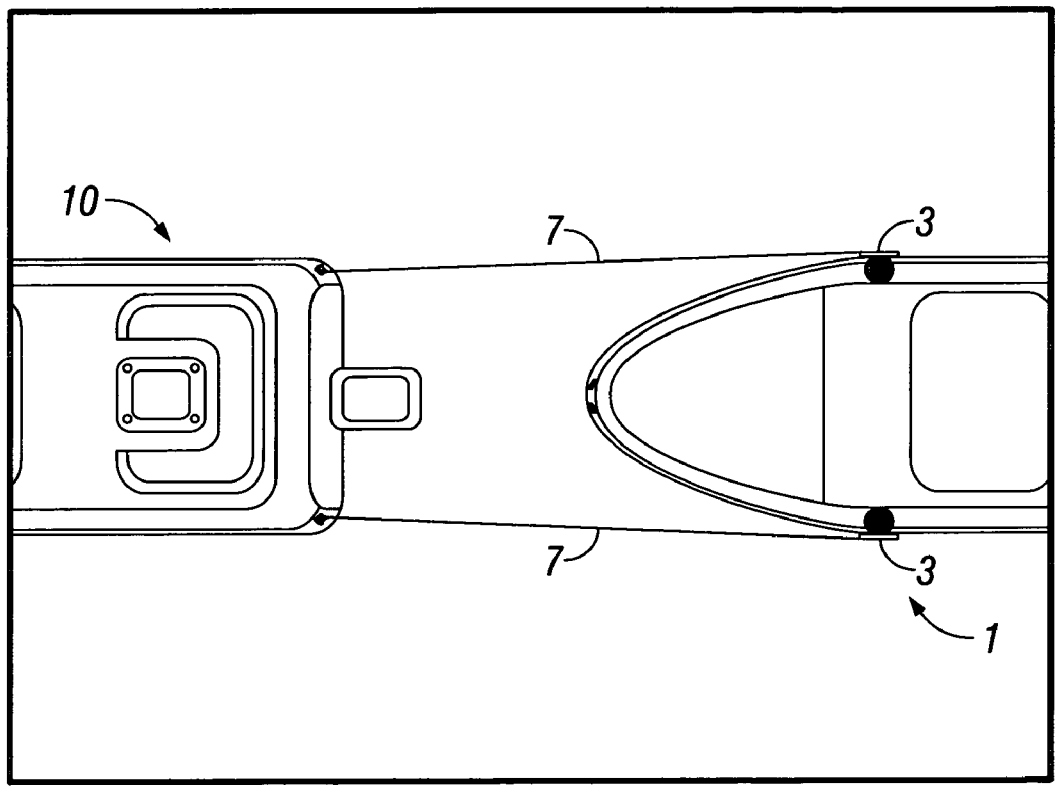

FIG. 1C also illustrates another embodiment of the housing units 3. In this embodiment, the housing 3 can be used to attached the ropes 7 to fishing poles 35. As is typical, for many boating fishermen, the fishing rigs 35 are many times kept in cavities 36 along the boat's 10 sides or aft region after they are cast. Similarly, fishing rig holders 36 can be mounted on upper decks of boats 10 for placing the rods 35 into the holders 36 while the fishing line drifts behind or next to the boat 10. Thus, the fishing lines can be cast and the fishing rigs 35 can be released, by the fisherman, until something has been caught on the hook. The rope housing 3 can be mounted next to each rod holder 36, in a central place to reach any number of holders 36, or any combination thereof. The rope 7 is preferably attached to the rod 35. This prevents the loss of the rod 35 in case a large fish or other large item is hooked and attempts to pull the rod 35 out of the holder 36. rear area FIG. 1D depicts a boat or water craft utilizing the present inventive system and apparatus being towed by boat without the present inventive system and apparatus. The boat or water craft 1 has at least two retractable rope housing units 3 located preferably on the front part of the boat or water craft 1. It is important to note that one or a plurality of retractable rope housing units 3 and the associated ropes or cables 7 can be utilized in many if not all of the embodiments disclosed herein. The ropes or cables 7 extend out of the retractable rope housing units 3 and preferably attach to the back side of the boat or water craft 10 in a conventional fashion as is known in the art for attaching towing ropes or cables. Upon activation, the ropes or cables 7 are firmly attached to the towing boat or water craft 10 and the retractable rope housing units 3 are actuated so that the ropes or cables 7 are pulled taught and will allow for the towing of boat or water craft 1. Upon deactivation the ropes or cables 7 are disengaged from the towing boat or water craft 10 and are then retracted in the retractable rope housing units 3 for storage.

Figure 1E:
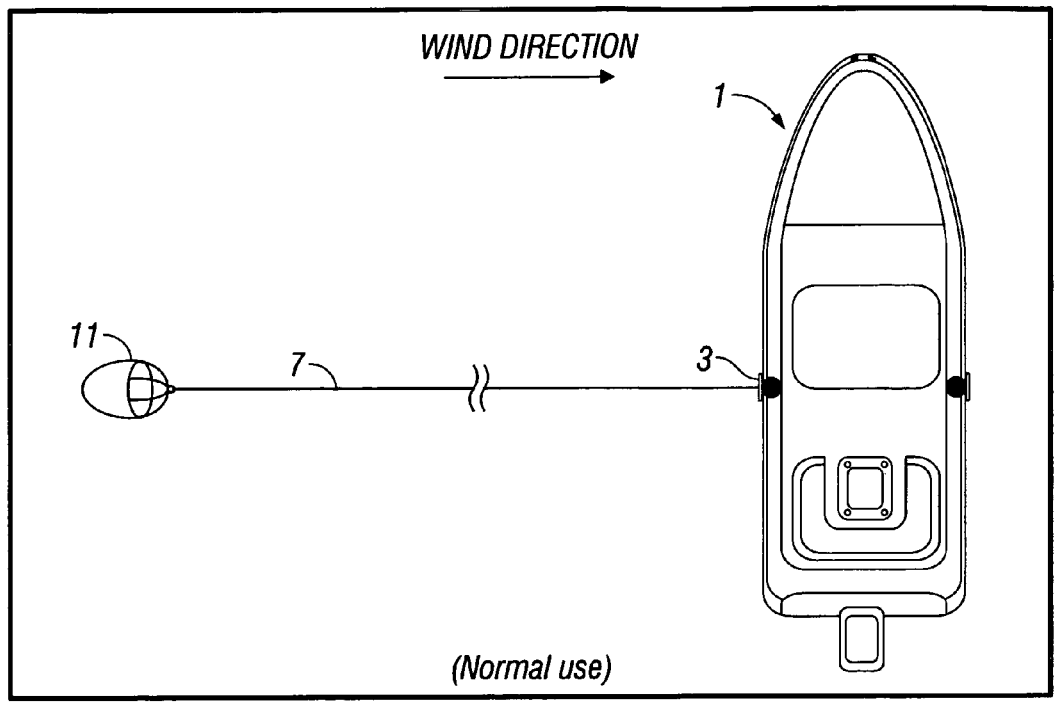
Figure 1E:
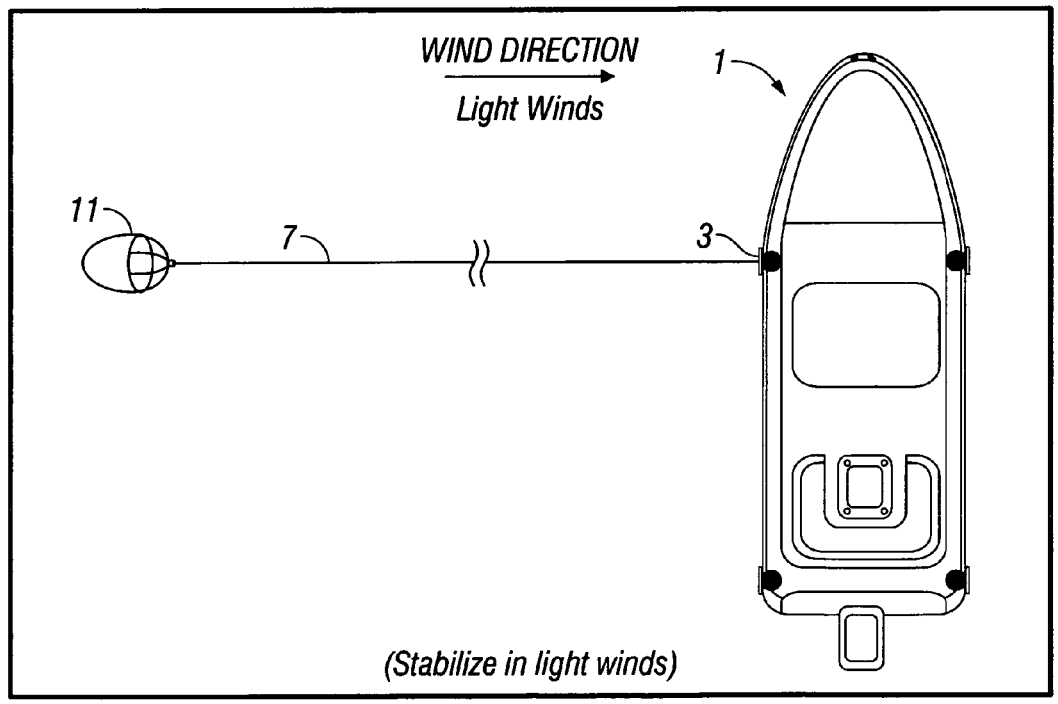
Figure 1E:
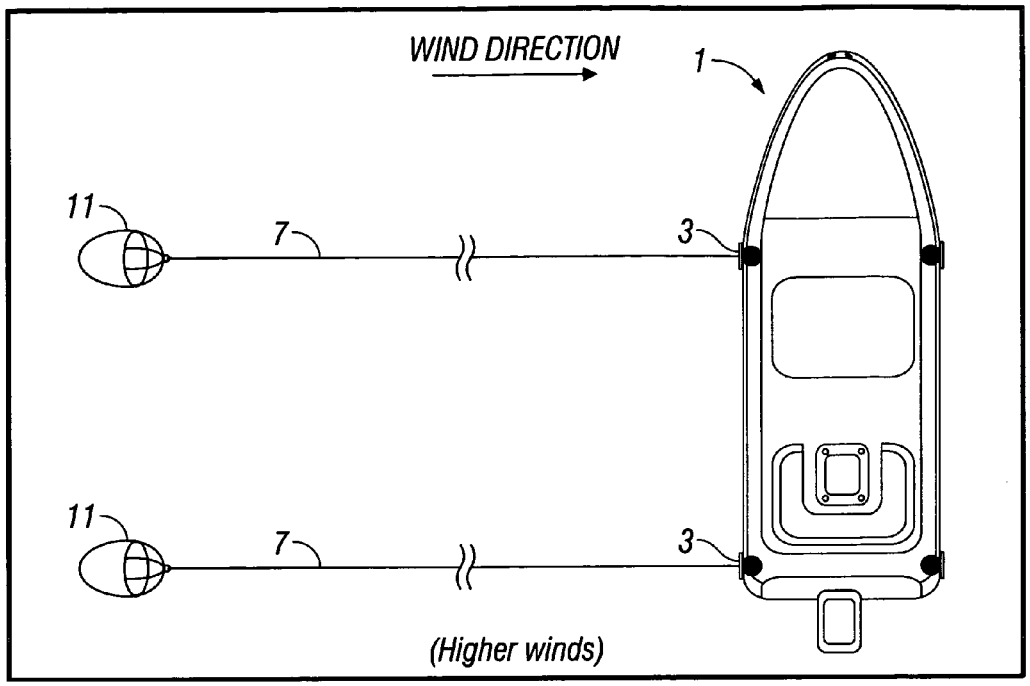
Figure 1E:
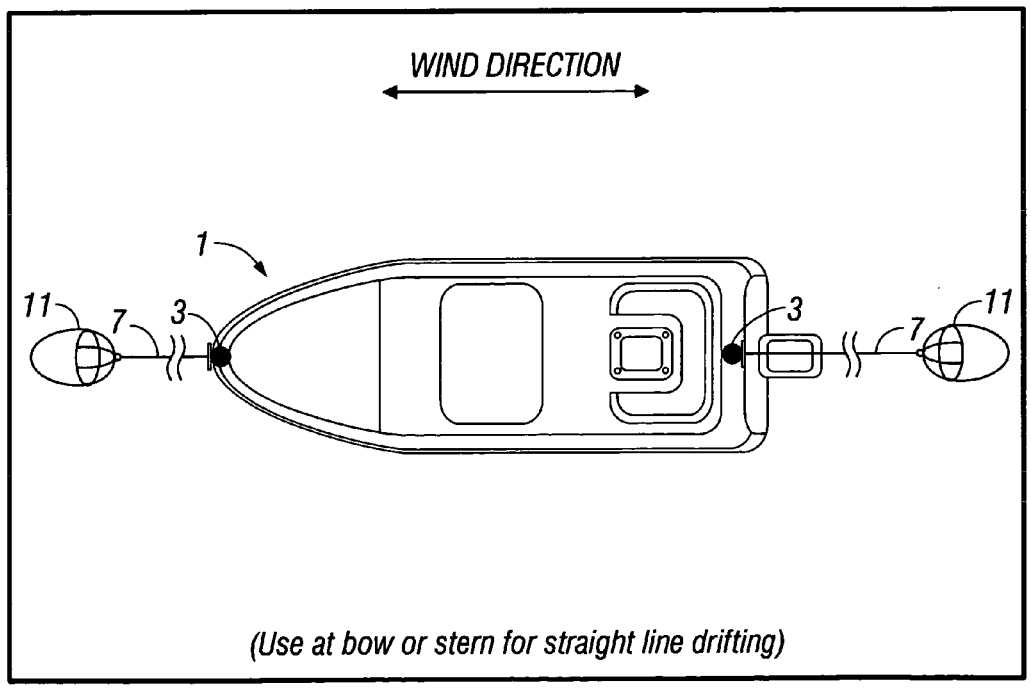

FIG. 1E illustrates several methods of attachment to a sea anchor. The boat or water craft 1 as depicted in the various illustrations can have the retractable rope housing units 3 attached to the boat or water craft 1 in various ways and a boat or water craft 1 can also have one or a plurality of retractable rope housing units 3. As shown, when in use each rope or cable 7 stemming from a retractable rope housing unit 3 attaches to a corresponding sea anchor 11. The sea anchors 11 are of the kind conventionally utilized with boats or water craft and can be of any size typically used for a given boat or water craft. In operation the ropes or cables 7 are pulled from the retractable rope housing units 3 and are attached to the sea anchor(s) 11 in the manner conventional in the art. The sea anchor(s) 11 are then positioned in the water as desired to either maintain the boat or water craft's 1 position or to allow for the boat or water craft 1 to drift with the tide.

Figure 1F:
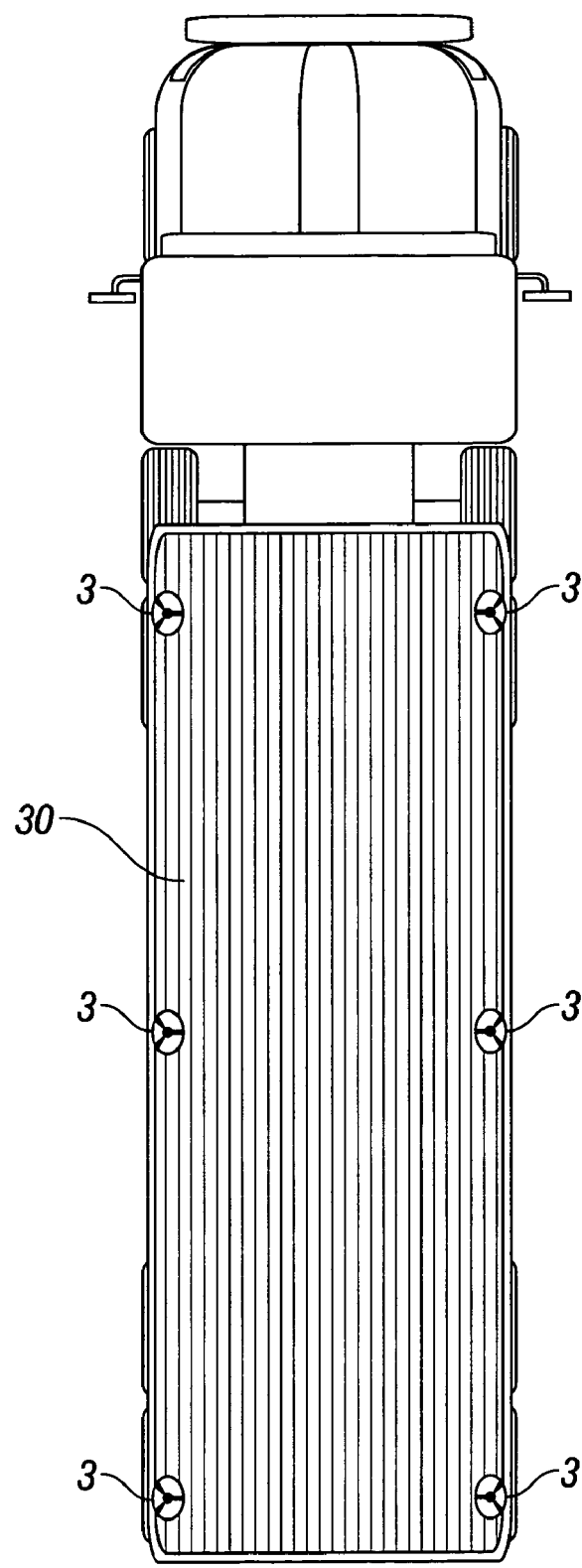
Figure 1G:
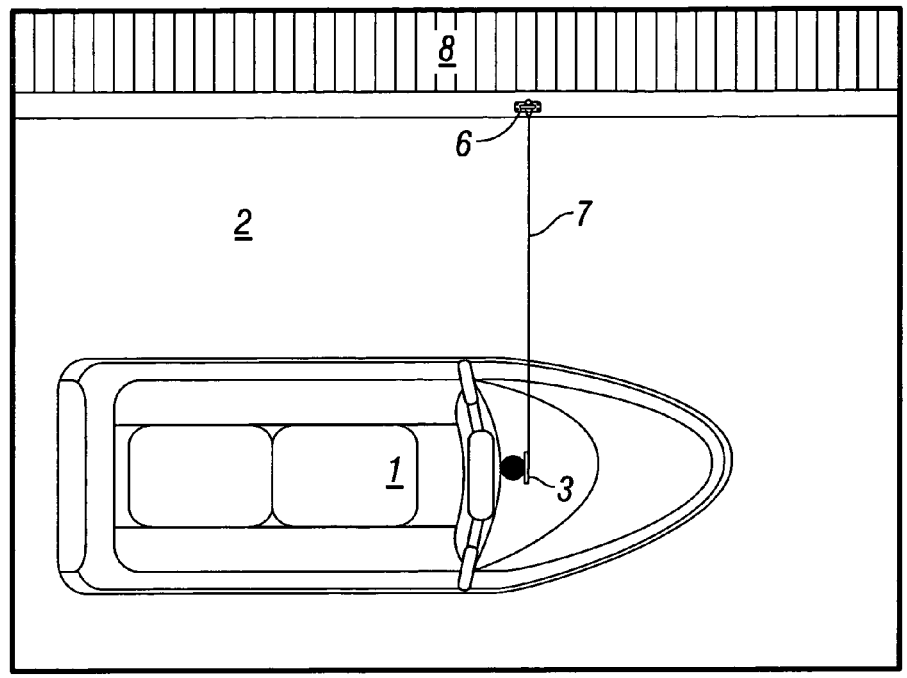

FIG. 1F illustrates the present device mounted on a truck bed 30. It should be appreciated that the housing units 3 could be mounted in the bed of a truck, such as but not limited to a pick-up truck, on the sides or walls of the truck, or even to a trailer bed and/or walls. The housing units 3 may be mounted so as to be flush or substantially flush with the truck or trailer bed or walls. The housing units could also be mounted so as to extend beyond the bed or wall surface of a truck since unlike water craft 1, users typically do not have to walk around the housing units while boarding or departing or during use. It should be understood, by those skilled in the art, that the methods of securing loads in a truck bed or trailer and the methods of securing the water craft 1 are similar as far as the actual utilization of the ropes 7 and the housing 3. Therefore, the description, of the construction and use of the present invention, would apply to use in trucks or water vehicles. The exception may be that the materials of construction may vary depending on the application, i.e. corrosive salt water environment, land use, or any other use FIG. 1G illustrates an embodiment of the housing 3, wherein the water craft 1 being tethered to the dock 8 is a personal water craft. Personnel water craft typically share a common problem when docking. One must stand up and remove the seat to retrieve rope or cable for mooring. Next, the water craft must be tied off to or otherwise tethered to the dock or other stationary structure. Particularly, the tethering may be a cumbersome and safety encumbering task as one must lean across the craft to reach the stationary attachment point or one must leave the craft to reach the stationary attachment point. Thus, it is easily seen how personal water craft operators can injure themselves (or others if carrying passengers) while attempting to dock or moor the personal water craft (whether it be from losing one's balance just retrieving the rope or during the tethering operation itself). Further, this process must be reversed when one is ready to un-tether the personal water craft. In this embodiment the housing 3 is preferably flush mounted or recessed relative to the surface of the personal water craft 1 the rope 7 can then be extended and ties to cleat 6 (or another housing 3, if such is mounted to the dock 8). It should be appreciated that more than one rope housing 3 may be mounted on the personal water craft 1. However, size limitations of the personal water craft 1 may make the mounting of several rope housings thereon impractical.

Figure 1H:
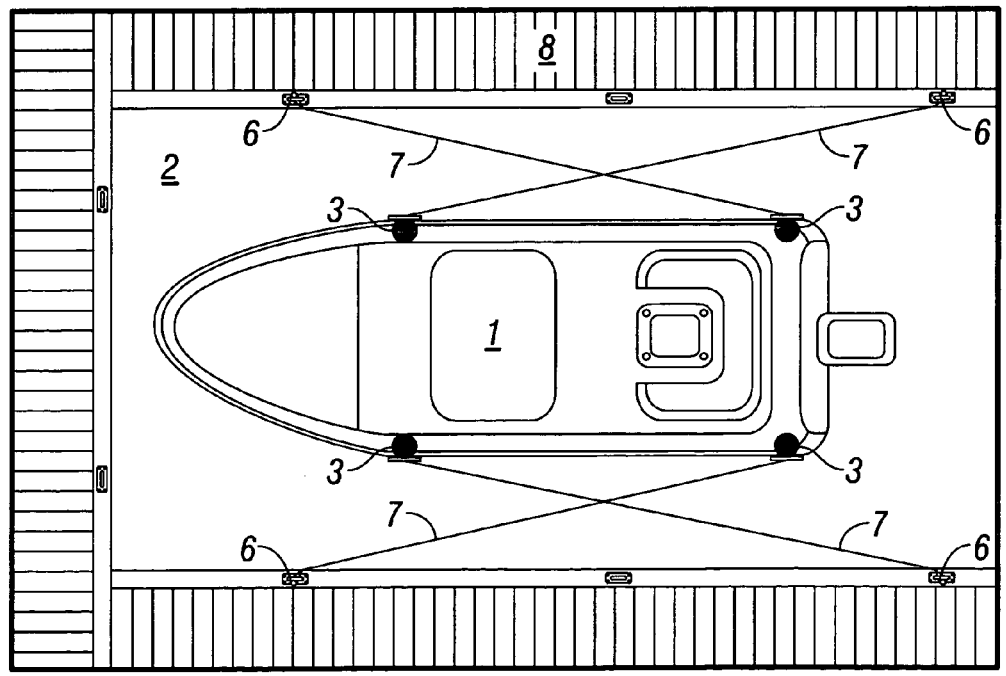

FIG. 1H illustrates an embodiment of housing 3, wherein the boat, water craft, or other vehicle 1 is being tethered in a manner that allows the docked boat, water craft, or other vehicle 1 to remain more stabilized and centered in its docking position. As is well known in the art, boats or other craft 1 are typically tied down in such a manner as to compromise between the craft bumping certain areas and floating a certain distance (including being able to float upwardly from the dock 8 in case of a sudden rise in water level). The present system can be utilized in a manner such that the rope or cable 7 is always being retracted toward the housing 3. It should be understood that once extended, rope or cable 7 will always attempt to retract. Thus, if retraction is unwanted, the rope or cable 7 can be tied off to the cleat 22 (see FIG. 4). As illustrated in FIG. 1H, the ropes 7 are extended and tied off to the dock 8 in a manner that forms a cris cross pattern. This can be accomplished in a variety of ways and should not be viewed as a limitation herein. A typical pattern comprises attaching a rope or cable 7 from a forward mounted apparatus 3 to an attachment point 6, on the dock 8, aligned closer to rear of the craft 1. A rope or cable 7, from a rear mounted apparatus 3 would preferably be attached to an a dock 8 attachment point 6 that is aligned closer to the front of the craft 1. In this manner and since the ropes 7 are biased to always retract, as the craft 1 moves forward, the forward mounted rope 7 is extended while the rear mounted rope 7 is retracted. Since preferably both apparatuses 3 have substantially the same spring tension attempting to retract the ropes 7, the extension of one rope 7 will be counterbalanced by the retraction of the other rope 7 and thus the craft 1 will tend to stay in substantially the same position. It should be appreciated that this cris crossing of the mooring ropes 7 can include several other attachment points including the sides of the craft not adjacent to the dock 8. It should be further appreciated that it would be quite difficult to eliminate all movement of the craft 1, however, the stability would be much greater than with conventional systems. It should be noted, that in case of rising water levels, the craft 1, utilizing the instant system would be less likely to sink due to the water level rising a distance greater than the slack between the dock 8 and the craft 1 because the ropes 7 would continue to extend and allow the craft to rise at a substantially level pace.

Figure 1I:
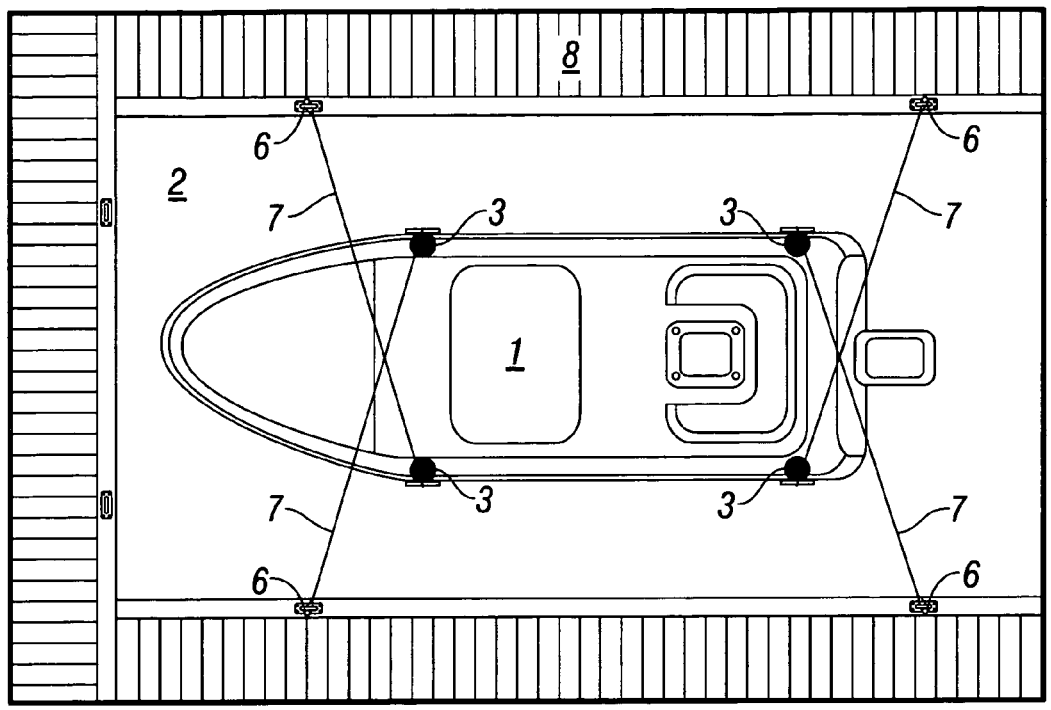
Figure 1J:
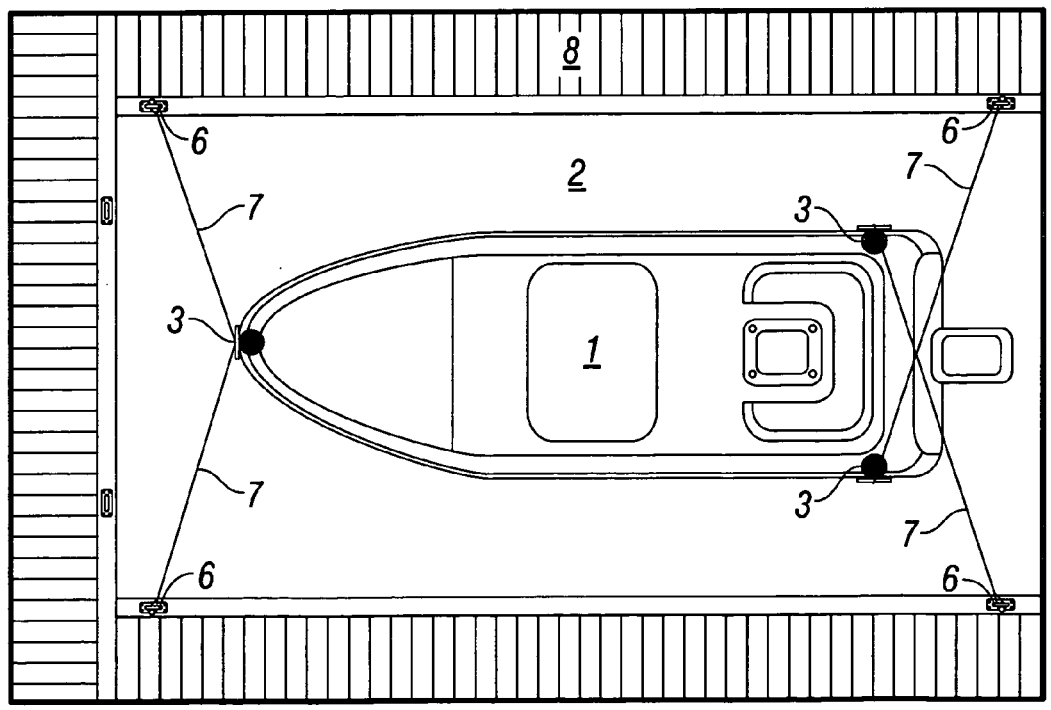
Figure 1K:
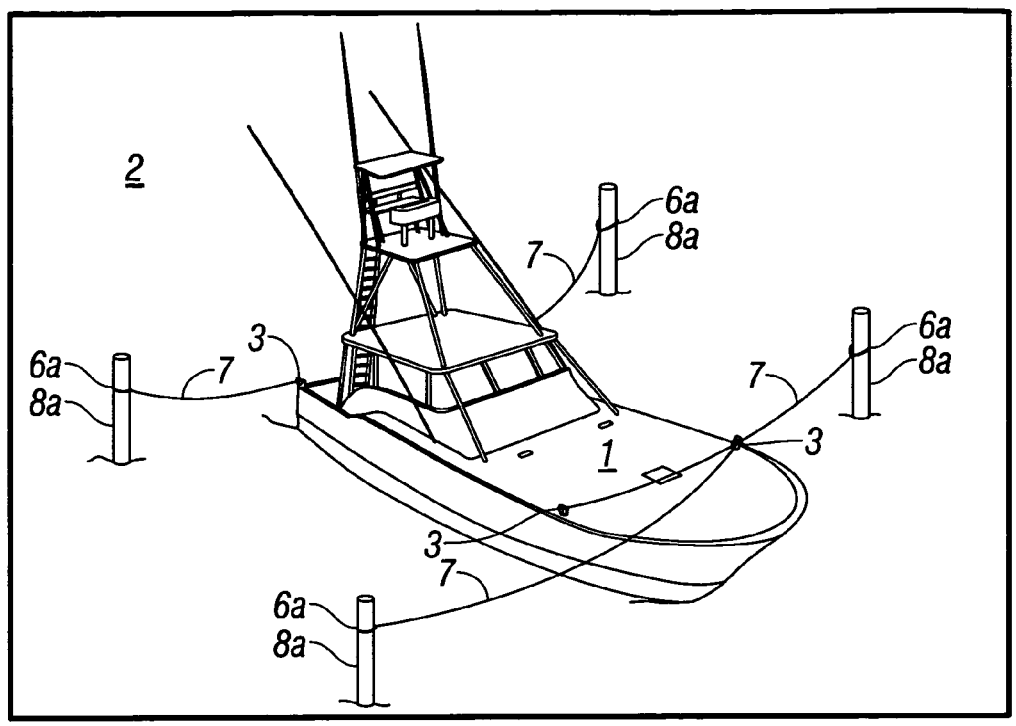

FIGS. 1I, 1J and 1K further illustrate the concept described hereinabove wherein the retraction of the cable or rope 7 substantially maintains the craft 1 in position within a docking area. To further illustrate the variety of attachment points, FIG. 1K illustrates pier docking wherein a water craft is moored to piers 8a at attachment points 6a. In one embodiment, the rope or cable 7 is secured from the starboard side, of the craft 1, to the port side of the dock 8. Another rope or cable 7 may be secured from the port side of the craft 1, to the starboard side of the dock 8. It should be appreciated that any aft or rear mounted housings 3 can be similarly attached (i.e. cris-crossing the craft 1) and that combinations of the crisscross, such as the aft attachments only (such as FIG. 1K), rear attachments only, both aft and rear attachments (FIG. 1I), or any combinations thereof can all be utilized without departing from the scope of this invention. It should be understood that the position of the housing 3, whether on the craft 1, or on the dock 8, on both, or in any combination therein can achieve the same result as depicted in FIGS. 1I, 1J, and 1K without departing from the scope of the invention. Further, it should be appreciated that an combination of the crisscross pattern will help stabilize the craft 1 and thus substantially maintain the position of the craft with respect to the dock 8.

Figure 1L:
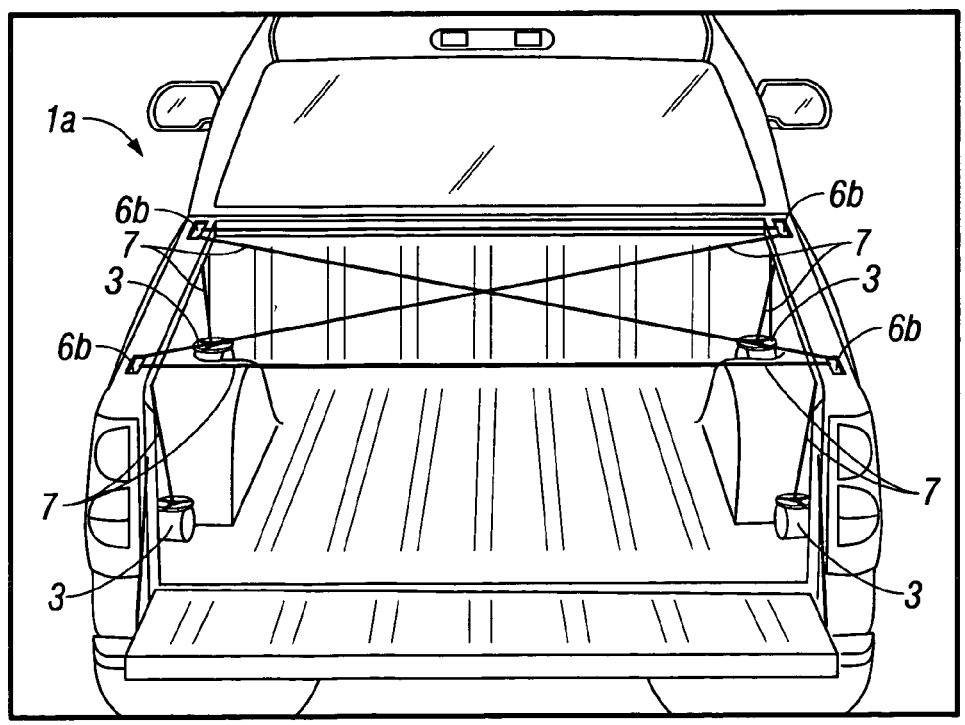

FIG. 1L illustrates a similar crisscross pattern of attachment for securing loads in trucks or trailers. Here, the housings 3 are mounted in a truck bed la (or in a trailer bed). The ropes or cables 7 are extended and attached to housings 3 or other attachment points 6b located in the truck bed or trailer 1a. It should be appreciated that when utilized, in any type of vehicles, a housing 3 can serve as both a source of the rope or cable 7 as well as an attachment point for a rope or cable 7 extending from another housing 3.

Figure 2:
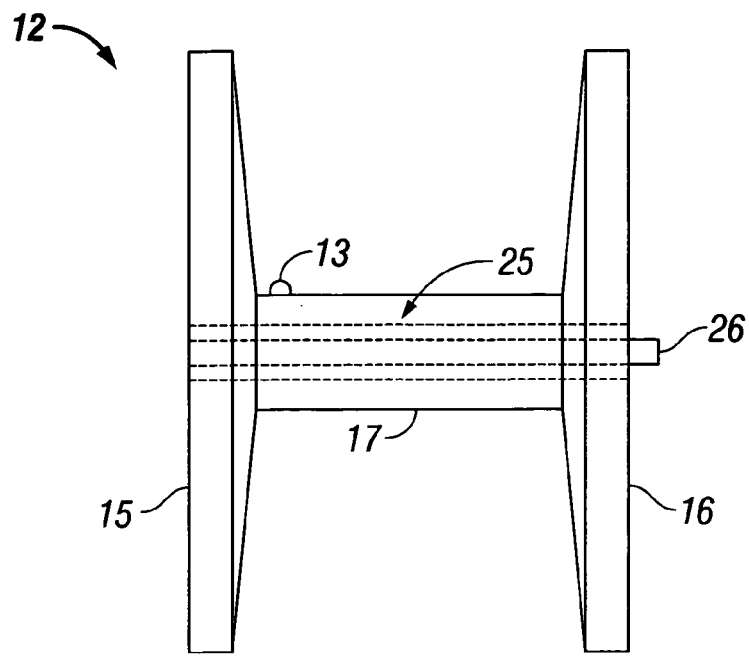
FIG. 2 illustrates a side pictorial view of the rope or cable spool in accordance with the present invention.
Figure 4:
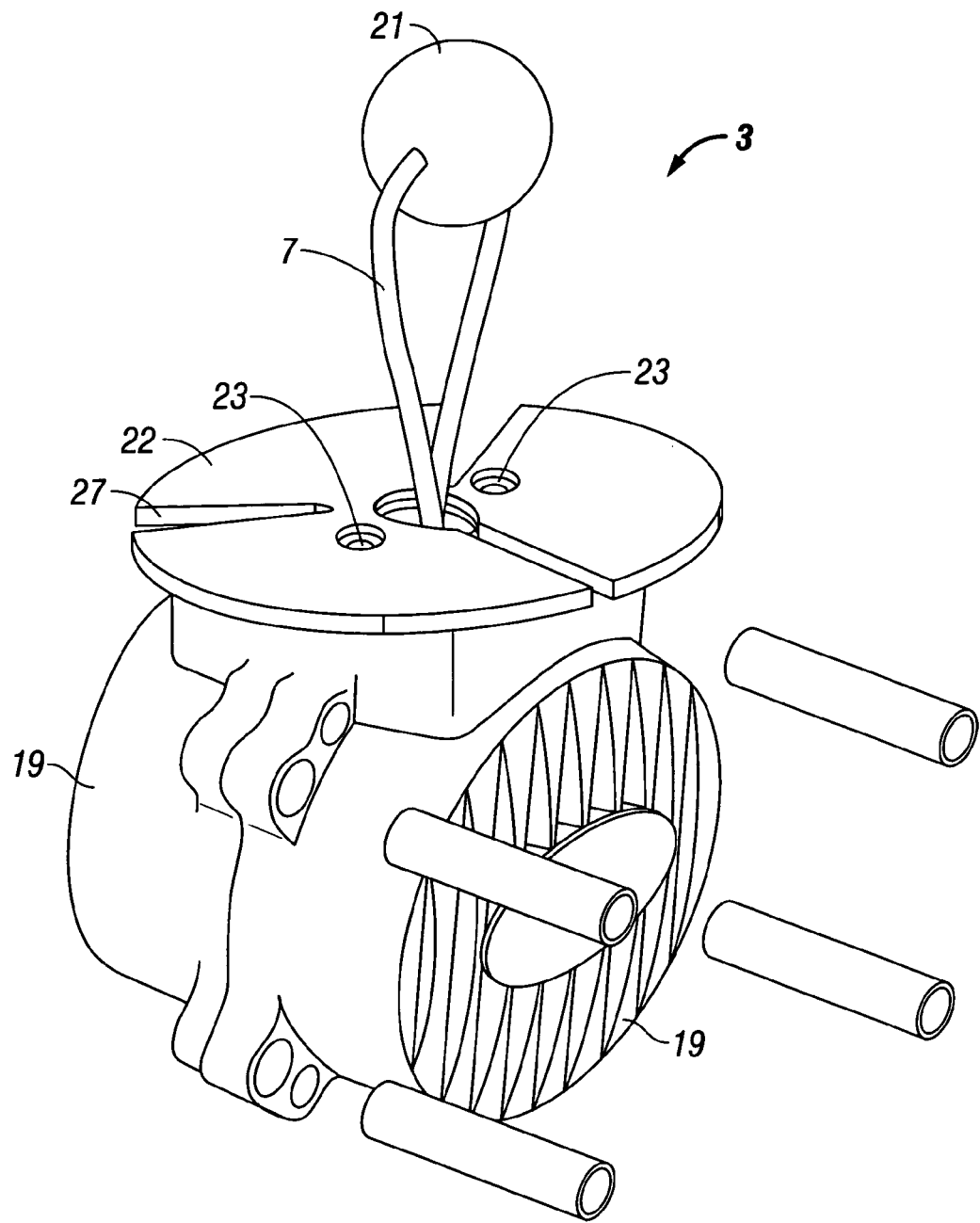
FIG. 4 illustrates varying designs for cleating units in accordance with the present invention.

FIG. 2 is a side view of the rope or cable spool 12. The rope or cable spool 12 is designed to preferably allow about fifteen to sixty feet of rope or cable 7 to be wound about its core 17. It should be noted that one of ordinary skill in the art could easily conceive of the rope or cable spool 12 being so constructed as to wind less than fifteen feet of rope/cable or more than sixty feet as needed. It should be appreciated that the length may depend on the size of the craft, the load being carried (size and weight), where the craft/vehicle is used or moored, and other similar circumstances. The spool 12 is preferably constructed so as to be non-rusting or non-corrosive and capable of aquatic and/or land use as needed. The spool 12 is preferably designed to have a top ridge 15 and a bottom ridge 16 to ensure that the rope or cable 7 is wound about the core 17 without any snags or problems. The bottom ridge 16 is preferably constructed to have a hollow bottom to allow for mechanisms, such as, but not limited to, a spring (see FIG. 2A), to reside in the hollow bottom of ridge 16 to retard, stop or allow the spool 12 to rotate therein allowing rope or cable 7 to come off of the spool. The mechanisms located under the ridge 16 are also designed to have a retraction feature, wherein the rope or cable 7 would be retracted and wound about the core 17 when the inventive apparatus is not use. It is foreseen that a clock spring mechanism would be employed to carry out this function. However, it should be appreciated that other spring type actuation or other mechanical actuation can be employed. In order to attach the rope or cable 7 to the spool 12, there is preferable an internal catch or clasp 13 located on the core 17. It is preferable that a small portion of the rope or cable 14 is placed through the catch or clasp 13 and securely held in place by the catch or clasp 13 such that the rope or cable 7 will be anchored to the spool 12. Therefore, upon rotation of the spool 12 the rope or cable 7 will wind about the spool 12. The spool 12 is also preferably constructed so that there is a hollow area 25 running through the core of the spool to allow for a rod 26 to pass through the core of the spool 12 therein keeping the spool 12 in place in the housing unit 3 (FIG. 4).

Figure 2A:
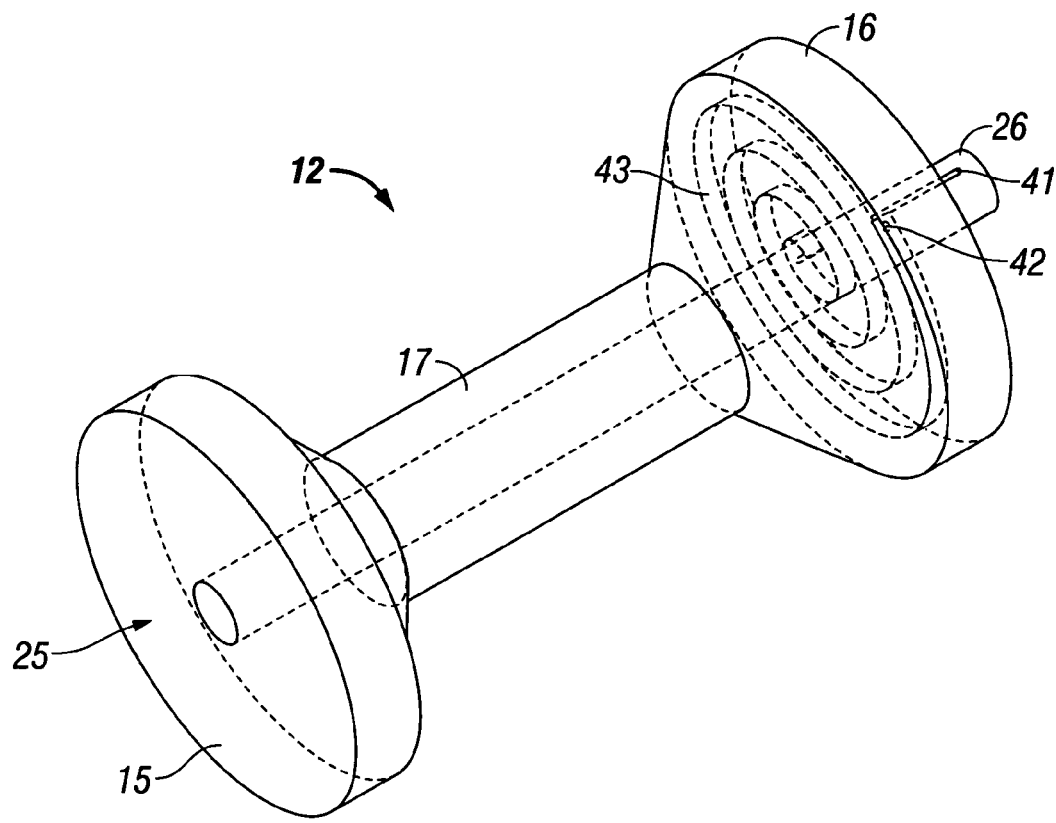
FIG. 2A illustrates a side view, partially in cross section, of the rope or cable spool in accordance with the present invention.

FIG. 2A further illustrates an embodiment of the cable spool 12 and the ridge 16. As described above, ridge 16 preferably houses the spring mechanism that allows for the retraction of the rope 7. Preferably, the interior of ridge 16 houses a spring 43. Spring 43 is preferably metal but can be a variety of materials. It should be appreciated that the materials of construction, of the spring 43, will have a direct bearing on the spring characteristics and thus the tightness of the rope 7. Preferably, the spring 43 will comprise several coils. One end of the spring 43 is connected to the rod 26. Preferably, rod 26 will be a split screw with the split 26 being at one end and available for the insertion of one end of the spring 43. The other end of the spring 43 is preferably connected to a screw or catch 42 which may be mounted to a wall of the ridge 16. It should be apparent that the end of the spring 26 can be attached in a variety of manners and that the attachment of the spring ends should not in any way be viewed as a departure from the claims of the instant invention. When the rope 7 is extended, the spring is stretched and thus biased so as to spin the spool in a direction to retract the rope or cable 7. Thus, the rope 7 is always being pulled back into the housing 3.

Figure 3:
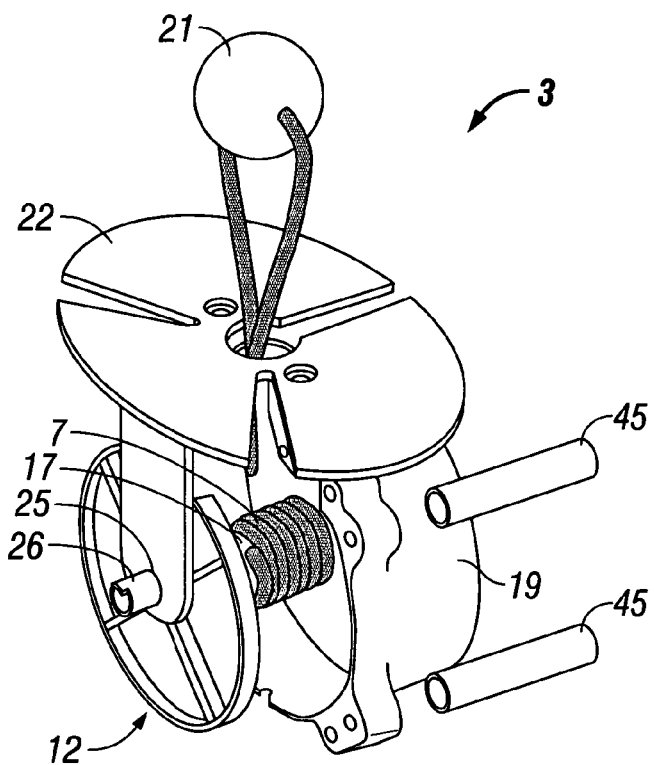
FIG. 3 illustrates an interior pictorial side view, partially in cross-section of the rope or cable spool as found housed in an embodiment of a housing unit in accordance with the present invention.

FIG. 3 illustrates a partial interior side view of the rope or cable spool 12 as may be housed in one embodiment of a housing unit 3. As shown there is a rope or cable 7 partially wound around the core 17. The spool 12 is kept centered in the housing unit 3 by a the rod 26 which runs through the hollow area 25 in the core of the spool. The spool is capped into the housing unit 3 by a casing 19 through with the end portion of the rod 26 runs. It should be appreciated that the casing 19 can be a two piece housing, a multi-piece housing, a single piece with or without a cap, or any combination thereof. The casing 19 is preferably constructed to allow for the spool 12 to rotate as needs be without the casing 19 introducing any serious friction elements. The casing 19 is also preferably constructed so as to have a hole or outlet by which the rope or cable 7 can exit the housing system 3 when in use.

FIG. 3 also illustrates attachment standoffs 45 which are preferably used when mounting the housing 3 onto a truck or trailer bed 30 (see FIG. 1F). The standoffs 45 allow for the housing 3 to remain clear of the bed 30. It should be understood that the housing 3 can be bolted to a bracket (not shown) which is mounted to the truck/trailer bed 30. In such a case the standoffs 45 may or may not be required depending on the bracket design. It should be further understood that some beds 30 may be designed to have or can have a false floor added onto the bed 30. Thus, the entire housing 3 can be mounted flush with or recessed from the false floor.

Figure 3A:
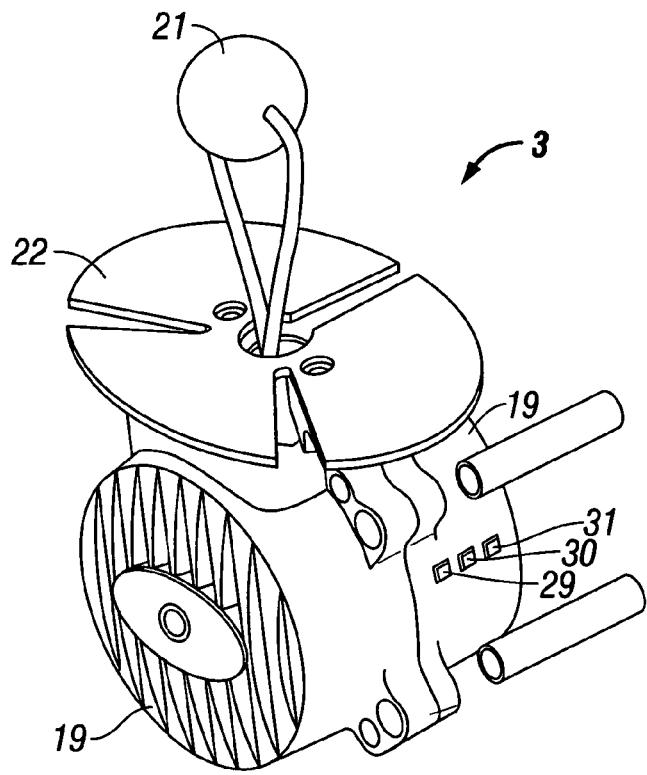
FIG. 3A illustrates a pictorial side view of the rope or cable housing with operational actuation mechanisms in accordance with the present invention.

As illustrated in FIG. 3A, there are preferably located on the casing 19 of one embodiment preferably three engagement buttons, the release system button 29, the catch system button 30, and the retraction system button 31. It should be noted that one of ordinary skill in the art could readily conceive of a single button or activation mechanism that could encompass all three functions of release, catch and retraction. Further, it should be apparent that the location of the buttons can change depending on the mounting orientation of the housing unit 3 as well as any other installation preference. The release system button 29 is preferably constructed so as to be attached to a series of gears and/or springs or similar activation mechanisms located in the housing unit 3. The gears and/or springs are generally designed to interact and contact the spool 12 such that certain positions of the gears and/or springs will allow for certain movement of the spool 12. When the release button 29 is actuated, the gears and/or springs substantially disengage the spool 12 to allow for freewheeling motion. The freewheeling motion allows for the spool 12 to move freely and rotate about the rod 26. Since the spool 12 can rotate, a user could then pull on rope or cable 7, therein unwinding the rope or cable 7 from the spool 12 for use exterior to the housing unit 3. When the catch button 30 is actuated, the gears and/or springs substantially engage the spool 12 and keep the spool 12 in a stationary position. The stationary position of the spool 12 acts like a braking mechanism and effectively keeps the cable or rope 7 from being unwound or wound onto the spool 12. It is foreseen that the catch or braking mechanism can be utilized to keep the rope or cable 7 stabilized while the boat or water craft is moored, docked or in tow. When the retraction system button 31 is actuated, the gears and/or springs substantially engage the spool 12 and act to rotate the spool 12 therein winding the cable or rope 7 on the spool 12. Such winding action will continue until the retraction system button 31 is deactivated or the rope or cable 7 is completely wound around the spool 12, with the exception of the end portion that preferably extends slightly out of the housing unit 3. The retraction aspect of the spool 12 allows for the rope or cable 7 to be wound onto the spool 12 for easy and quick storage. It should be noted that the present inventive device could be constructed such that the original positioning stage of the spool 12 can be in the catch, release or retraction mode. It should also be appreciated that embodiments without buttons still fully function with retraction and extension available at all times. It may be desirable to have extension and retraction with the spring 43 (see FIG. 2A) being biased for the retraction mode.

FIG. 4 illustrates a cleating unit associated with the apparatus 3. It is important to note that the cleat 22 may be designed to be flush with the boat skin, trailer bed, or the truck bed so as to reduce the potential for injuries and damage to the apparatus 3. It should be recognized the cleat 22 can also be mounted separate from the housing 3. As illustrated, one cleat 22 embodiment has substantially a shape of three interconnected pie shapes of unequal size. However, the cleat 22 can have any variety of conventional cleat shapes or modified cleat shapes. It should be appreciated that the primary function of the cleat is to provide a convenient tie down location to help maintain the extended rope in a static position. The cleat 22 is preferably attached to the top of the housing 3 thru attachment holes 23. It should be understood that the number of attachment points 23 can vary depending on the size of the cleat, the size of the rope or cable 7, and the load to be restrained. The method of attachment can comprise a variety of conventional methods, including but not limited to bolts, screws, rivets, welds, snaps, pins, and the like. Further, the cleat 22 preferably has at least two grooves 27 which allow for the treading of the rope or cable 7 to allow the rope or cable 7 to be locked into place. It should be appreciated that the number of grooves 27 may vary depending upon the type of cleat, the load to be held, the size of the cable or rope 7, and the like. FIG. 4 also illustrates a ball 21 positioned at one end of the rope 7. The ball 21 preferably serves to prevent the end of the rope 7 from being retrieved fully into the housing 3 and to provide a convenient grip or catch for the rope 7. The cleat 22 can be used in combination with a dock cleat (#6, FIG. 1B) or another separate cleat mounted on a truck or trailer. Further, it is envisioned that a cleat 22 can comprise a locking device, separate from the tying of the rope 7. The locking device can be a face plate that turns to lock or tighten the rope 7.

It may be seen from the preceding description that a new and improved system and method for docking, roping, anchoring, and mooring has been provided. Although very specific examples have been described and disclosed, the embodiment of one form of the apparatus of the instant application is considered to comprise and is intended to comprise any equivalent structure and may be constructed in many different ways to function and operate in the general manner as explained hereinbefore. Although the embodiments described herein operate on principles of mechanical springs, any type of electrical or mechanical crank backups are fully contemplated herein and should not be viewed as a limitation thereof. Accordingly, it is noted that the embodiment of the new and improved system and method described herein in detail for exemplary purposes is of course subject to many different variations in structure, design, application, form, embodiment and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

I claim:

1. A method of anchoring a vehicle or load comprising:
   mounting a housing unit containing a spool at a first location, wherein said mounting of the housing unit is substantially flush with at least one surface of the first location;
   providing a rope or cable having a first end and a second end comprising an engagement member;
   attaching said first end of said rope or cable to the spool;
   extending said second end of the rope or cable from said spool;
   biasing said extended rope or cable to continuously urge retraction;
   providing a second location with a generally flat cleat, wherein said generally flat cleat is substantially flush with the second location, wherein said generally flat cleat comprises at least one groove configured to retain a portion of said rope or cable or the engagement member, and wherein said generally flat cleat prevents of said extended rope or cable; and
   attaching said second end of the rope or cable to the second location by engaging the portion of said rope or cable or the engagement member with said at least one groove of the generally flat cleat.

2. The method of claim 1, wherein the first location is disposed on a member selected from the group consisting of: a watercraft, a dock, a truck, a trailer, an aircraft, and combinations thereof.

3. The method of claim 1, wherein the spool comprises a first ridge defining a first guide, a second ridge defining a second guide, and a core disposed between the first ridge and the second ridge, wherein the first ridge is hollow, and wherein the biasing of said extended rope or cable to urge retraction is performed using a spring disposed in the first ridge.

4. The method of claim 1, wherein a portion of the rope is formed into a loop, and wherein the attaching of said second end of the rope or cable to the second location comprises securing the loop to the second location.

5. An apparatus comprising:
   a housing adapted to be mounted substantially flush against a preexisting exterior surface;
   a spool with an axis partially enclosed within the housing, wherein the spool is mounted to rotate about the axis, the spool comprising a first ridge defining a first guide, a second ridge defining a second guide, and a core disposed between the first ridge and the second ridge, wherein the first ridge is hollow;
   a rope having a first end and a second end comprising an engagement member, wherein said first end is connected to said spool;
   a spring disposed within the first ridge, wherein the spring is configured to bias the rotation of the spool to continuously resist unwinding of the rope from the spool and to continuously urge rewinding of rope previously unwound from the spool; and
   a generally flat cleat having at least one groove, wherein said groove is sized to receive the engagement member, wherein said groove substantially restrains retraction of the rope, and wherein the cleat is substantially flat for mounting substantially flush with at least one surrounding surface.

6. The apparatus of claim 5, wherein the surface is disposed on a member selected from the group consisting of: a watercraft, a dock, a truck, a trailer, an aircraft, and combinations thereof.

7. The apparatus of claim 5, wherein a portion of the rope is formed into a loop, wherein the loop is configured for securing to cleats.

8. The apparatus of claim 5, wherein said second end of the rope further comprises an adjustable loop for securing to a second location.

9. A method for anchoring a vehicle or load, the method comprising the steps of:
   providing a rope or cable having a first end and a second end;
   mounting a housing unit containing a spool attached to said first end of said rope or cable at a first location on the vehicle or load, wherein the housing unit comprises a round cleat disposed thereon, wherein said round cleat comprises a through bore through which the second end of the rope or cable passes, and wherein said round cleat and said housing unit define a space therebetween;
   extending said second end of said rope or cable through said round cleat from said spool;
   forming a loop using said second end of said rope or cable;
   passing said second end of said rope or cable through said loop;
   engaging said loop within said space between said round cleat and said housing unit;
   further extending said second end of said rope or cable to tighten said loop around said round cleat; and
   securing said second end of said rope or cable to a second location remote from the vehicle or load.

10. The method of claim 9, further comprising the step of providing the second location with a generally flat cleat, wherein said generally flat cleat is substantially flush with the second location, wherein said generally flat cleat comprises at least one groove configured to retain a portion of said rope or cable, and wherein said generally flat cleat prevents retraction of said extended rope or cable such that the vehicle or load is anchored.

11. The method of claim 9, further comprising the step of attaching said second end of the rope or cable to the first location by engaging the engagement member or the portion of said rope or cable with said round cleat.

* * * * *